United States Patent [19]

Rust

[11] 4,311,015

[45] Jan. 19, 1982

[54] CARNOT CYCLE HEAT OPERATED MOTOR

[76] Inventor: Rudolph Rust, 8192 Deerfield Dr., Huntington Beach, Calif. 92646

[21] Appl. No.: 109,667

[22] Filed: Jan. 4, 1980

[51] Int. Cl.³ .............................................. F01K 7/00
[52] U.S. Cl. ........................................ 60/675; 60/531
[58] Field of Search ................................ 60/675, 531

[56] References Cited

U.S. PATENT DOCUMENTS 1,115,524  11/1914  Fiorio ..................................... 60/675
3,785,144  1/1974  Fairbanks ............................... 60/531

*Primary Examiner*—Allen M. Ostrager
*Assistant Examiner*—Stephen F. Husar
*Attorney, Agent, or Firm*—Archie M. Cooke

[57] ABSTRACT

A machine utilizing the unbalance created by liquid driven from lower vessels to upper vessels by vapor pressure of a dual fluid said unbalance being utilized to rotate a shaft to which the vessels are attached. Continuation of rotation is achieved by a criss-cross fluid passage arrangement whereby the fluid from the lower heated vessel is transferred to the upper vessel next to be immersed in a cooling medium while the fluid from the lower colder vessel is transferred to the upper vessel next to be immersed in a heating medium.

2 Claims, 3 Drawing Figures

CARNOT CYCLE HEAT OPERATED MOTOR

UNITED STATES PATENTS CITED

| | | | |
|---|---|---|---|
| 3,552,120 | Jan 5, 1971 | Wm T. Beale | Cl 60/24 |
| 3,584,457 | Jun 15, 1971 | John G. Davoud | Cl 60/36 |
| 3,600,886 | Aug 24, 1971 | H. A. Jaspers | Cl 60/24 |
| 3,603,087 | Sep 7, 1971 | C. V. Burkland | Cl 60/64 |
| 3,828,558 | Aug 13, 1974 | Wm T. Beale | Cl 60/520 |
| 3,937,017 | Feb 10, 1976 | F. Beschorner | Cl 60/516 |
| 3,937,018 | Feb 10, 1976 | Wm T. Beale | Cl 60/520 |
| 3,967,450 | Jul 6, 1976 | J. P. Girardier | Cl 60/657 |
| 3,971,230 | Jul 27, 1976 | J. C. Fletcher | Cl 62/6 |

SUMMARY

This invention is a means for stationary power generation. It converts heat energy, from externally heated liquids, into rotary motion in a heat operated motor. The new engine is operated by gas expansion. A vaporizing working fluid forces liquid movement in the machine causing a unbalanced force couple that rotates the motor. In particular, this apparatus is a means for using a very large temperature gradient to drive a rotating mechanism using a liquid heat source, the force of gravitation, and a flowing liquid cold sink.

It needs neither maintenance nor lubrication. Both geothermal heat, and solar heat energy can drive this completely enclosed heat operated motor that releases nothing to contaminate the external environment. Its internal means of operation results in a large temperature gradient driving the device. It is intended to be used in remote places.

For high temperature use, above 212 deg F., a high temperature dual working fluid is used. Water is vaporized into steam leaving a glycol liquid behind. Subsequently, the steam is condensed and recombined. Examples of these high temperature glycols are Ansul E 181, and Pluracol P 410. These organic liquids are thermally stable at the high temperature range of steam production during the heating part of the cycle. For torque conversion an auxilliary set of vessels is attached to the axle utilizing mercury as a transfer fluid.

Other objectives and advantages of this invention will become apparent herein, during a detailed examination of the thermodynamic cycle. This invention has a unique piping means for simultaneous fluid transfer between the hot source, and cold sink, to increase the usable Carnot thermodynamic temperature gradient. The drawings show the internal details of the combined series and parallel pumping means used to rotate the hot and cold vessels to obtain power.

DESCRIPTION OF THE PREFERRED EMBODIMENT

Figure 1:
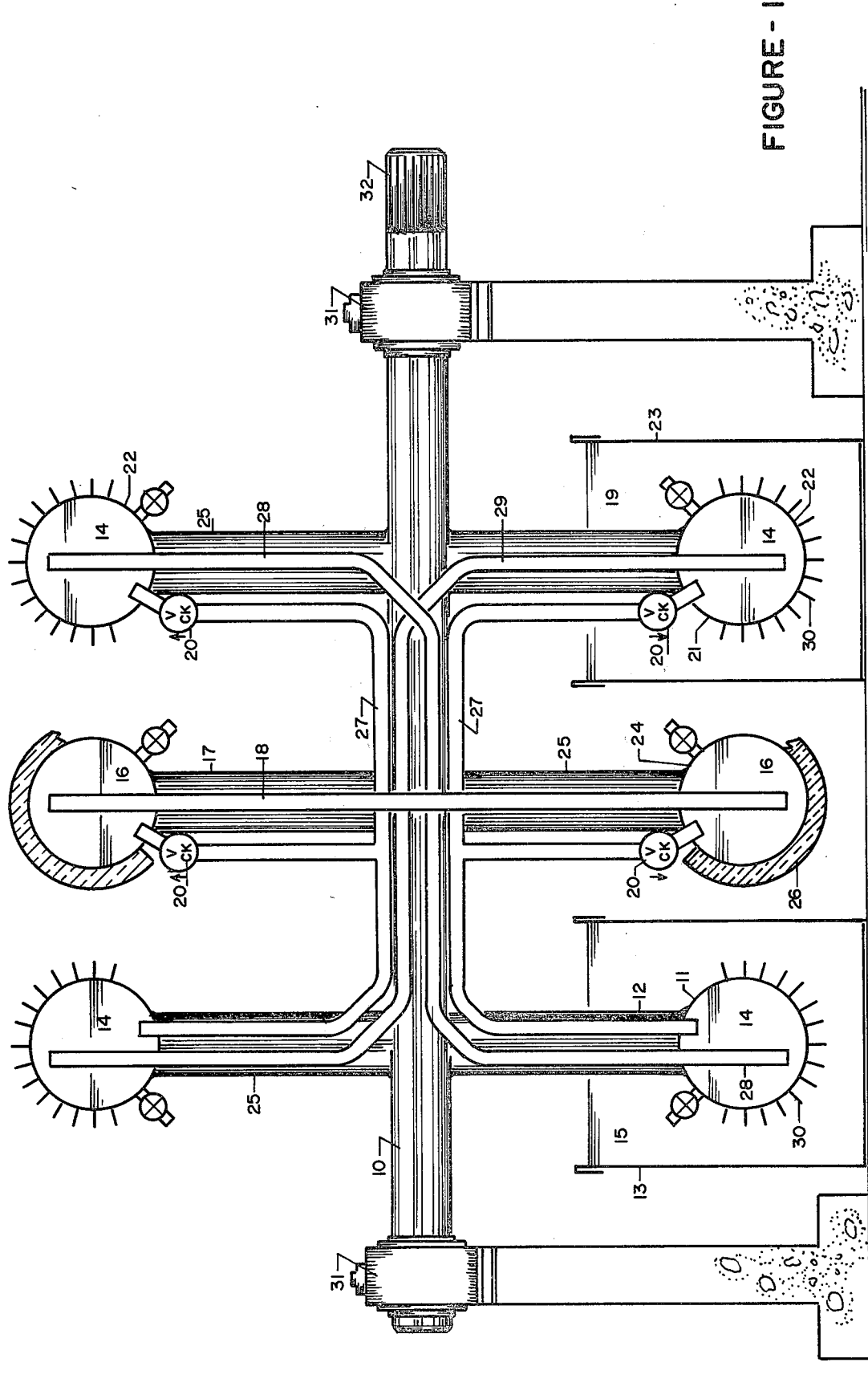
FIG. 1, shows a side view of the heat operated motor.
Figure 2:
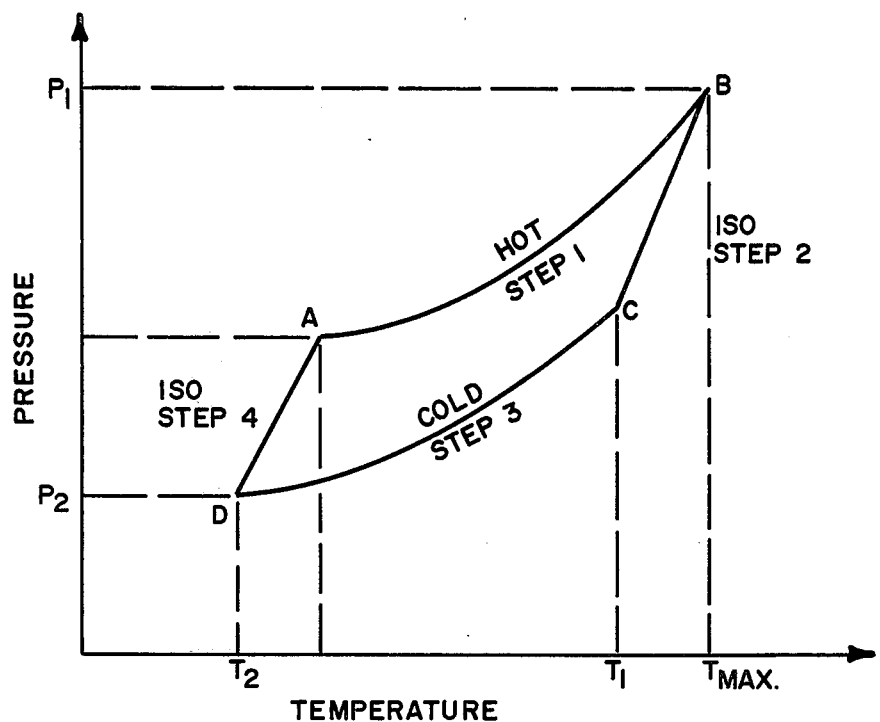
FIG. 2, shows a pressure versus temperature, indicator diagram for the operating cycle.
Figure 3:
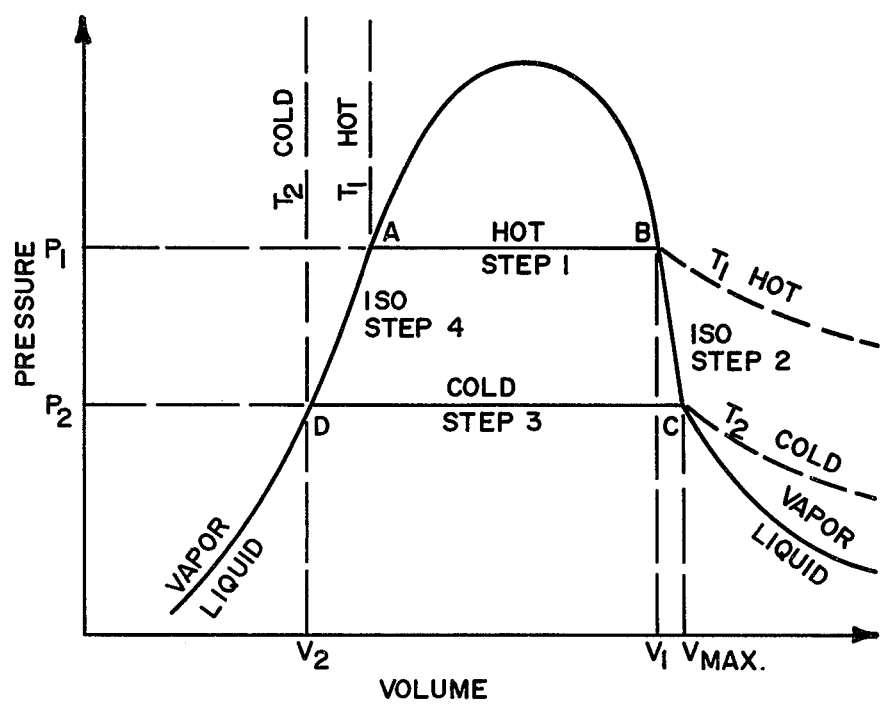
FIG. 3, shows the complete thermodynamic cycle of the heat operated motor.

For the preferred embodiment of the invention specific terminology will be used. However, it is not intended to limit the specific terms so selected. It is to be understood that each specific term includes all technical equivalents which operate in a similar manner to accomplish a similar purpose.

Referring to FIG. (1), the preferred embodiment is a heat operated motor 10, with a unique rotating mass displacement system. This machine is a means of using heat derived gaseous pressure, with subsequent reliquefaction, to force hot and cold liquids to exchange places simultaneously once each half cycle. In FIG. (2), the diagram shows an alternating contact between hot and cold sides of the machine. Simultaneous mass exchange between vessels entering into hot and cold sumps is done automatically every half cycle during rotation.

Step one, of the thermodynamic cycle starts at point (A) when each hot wheel generator 11, on the hot wheel 12, enters into the hot wheel sump 13 by rotation. At point (A) the temperature of the dual working fluid 14 approaches a maximum by contacting an external hot liquid 15. This specifies $p_1$ $v_1$ $t_1$ inside said hot wheel generator 11. The hot liquid 15 is remotely heated glycol, water, Dowtherm, Caloria 43, Mobiltherm 600, Therminol 66, or molten carbonates heated by geothermal means or solar means as in my U.S. Pat. No. 4,040,411.

A hot liquid 15 causes said working fluid 14 to vaporize and force liquid mercury 16 to rise inside a power wheel 17. The preferred embodiment uses a dual working fluid 14 made of a binary mixture of miscible liquids having vapor pressure intermediate between the vapor pressures of the pure components comprising glycol and water, or ammonia (R 717) and water. Said internal working fluid 14, can also be a dual combination of fluorinated hydrocarbons and commercial types of refrigerants (R 11), (R 12), (R 22), (R 114), butane gas (R 600), methyl chloride (R 40), propane (R 290), sulfur dioxide (R 764), methane (R 50), glycols Ansul E 181 and Pluracol P 410, or thiophene. Each hot wheel generator 11 is contacted, in turn, by said hot liquid 15 from point (A) to (B). A vapor is generated by the heat, thus producing an iternal gas pressure $P_{max}$ that forces said liquid mercury 16 up a liquid transfer tube 18. This movement up against gravity converts heat into work.

In FIG. (3), for the complete thermodynamic cycle, a standard curve is shown that characterizes the changes of state for said working fluid 14. It depicts variations of pressure, and volume for a given mass of liquefiable fluid. Internally, before starting the device at point (A), there will be normal conditions with ambient p, v, t. The central "bell" curve in FIG. (3) is a zone in which the vapor phase and the liquid phase of said internal working fluid 14 coexist in equillibrium. At the left side of this curve, said working fluid 14 is liquefied. Conversely, on the right side of the curve, said working fluid 14 is in a vaporized state. Starting is automatic when said hot liquid 15 is poured into said hot wheel sump 13.

Prior to starting the system hydrogen gas is used at moderate pressure to purge the air out thru valves shown on said hot wheel generator 11, and other places. After checking for leaks the hydrogen is allowed to escape, and a vacuum pump is connected to the same valve. A vacuum of at least 96% is created in the piping lines prior to filling with said working fluid 14. It is injected into said hot wheel generator 11. A stream of cold water 19 at about 10 C. (50 F.) is sprayed on the tanks during this operation.

Two non-return check valves 20 on the inverted position prevent migration of liquid mercury 16, and working fluid 14. The cold wheel 21 is fabricated from a series of sealed pipe sections welded together forming a cold wheel condenser 22 for each similar hot wheel generator 11. As they rotate to the bottom of the wheel each cold wheel condenser receives gas. At the top they get liquid. Said cold wheel 21 rotates in a cold wheel sump 23 filled with flowing cold water 19.

The middle wheel, said power wheel 17, is formed with sealed accumulators 24 attached by spokes 25. They are used to transfer said liquid mercury 16 inside one or more power wheels 17. The power wheel next to said hot wheel 12 has insulation 26 facing the hot side. A gas pressure tube 27, having two check valves 20, connects with said accumulators 24 placed between each cold wheel condenser 22, and its corresponding hot wheel generator 11 around the wheel.

The heat from said hot liquid 15 increases the enthalpy of said working fluid 14. This increased enthalpy requires (B) BTU to convert (M) lbs of said working fluid 14 to a gas with latent heat of vaporization (L) BTU/lb according to the formula;

$$B \text{ BTU} = M \text{ lbs} \times L \text{ BTU/lb}$$

This gas increases the pressure inside said heat operated motor 10. The internal gas pressure is used to push the liquids from the lowest vessels, on the three wheels, to the highest vessels all together at the same time. The pressure (P) PSF required to raise the liquid having liquid density (D) lb/ft$^3$, against gravity from the lowest height of (h) ft to a highest elevation of (H) ft, is given by the formula;

$$P \text{ PSF} = (H \text{ ft} - h \text{ ft}) \times D \text{ lb/ft}^3$$

The gas moved by means of said gas pressure tube 27 separates the gas and liquid components of said working fluid 14. Rotation of the apparatus shown on FIG. (1) is the means by which switching the liquid is accomplished. Gas pressure is only introduced when all the lowest vessels reach their bottom positions. This instantly forces simultaneous liquid movements on all three wheels.

The amount of work (W) ft lb, that must be done to lift ($M_1$) lb of said hot working fluid 14, and ($m_2$) lb of said liquid mercury 16, and ($m_3$) lb of said cold working fluid 14, through the change in elevation is given by the formula;

$$W \text{ ft lb} = (M_1 \text{ lb} + M_2 \text{ Lb} + M_3 \text{ lb}) \times (H \text{ ft} - h \text{ ft})$$

Across from each bottom hot wheel generator 11, is an upper cold wheel condenser 22 connected by means of a liquid delivery tube 28. Each half rotation it becomes a liquid return tube 29. Then it returns cold working fluid back to said hot wheel 12, from vapor pressure, by means of said gas pressure tube 27. This criss cross pipe network simultaneously exchanges the same amount of hot and cold working fluid 14 by rotating.

Contact between said hot wheel generator 11 and said hot liquid 15 outside is broken at point (B). There natural gravity starts the second step of the thermodynamic cycle. A gravity force couple, rotates the top heavy heat operated motor 10. This gravity coupling is the same force that has rotated the ancient water wheel since antiquity. When each partially empty hot wheel generator 11 rises out of said hot wheel sump 13, the remaining working fluid 14 is isolated and it stops producing gas.

In FIG. (2), point (B) is where glycol remains in a hot wheel generator 11 after releasing steam that is driven off above 212 deg F. Alternatively, at lower temperatures water remains behind when ammonia is driven off. In FIG. (3), the expansion of the steam in said heat operated motor 10 stops at point (C). The introduction of it sequentially into each bottom cold wheel condenser 22, through said gas pressure tube 27, is by path A, B, C.

Said liquid mercury 16 in the top vessel on said power wheel 17 rotates to a lower position by gravity. This also brings a top cold wheel condenser 22 into said cold wheel sump 23. It moves into said cold water 19 at point (C). Forced cooling takes place from points (C) to (D).

For said heat operated motor 10 to run continuously, gas pressure must be reduced, in a third step of the thermodynamic cycle. The hot gas will pressurize the lowest cold wheel condenser 22, and start condensing the gaseous part of the dual working fluid 14 from point (C) to (D). Vapor condensation occurs at the same time that liquid is transferred on all three rotating wheels during the first cycle from points (A) to (B).

The hot vapor in said gas pressure tube 27 passed to each bottom cold wheel condenser 22, condenses and mixes. The mixture of previously cooled liquid and pure condensed vapor have heat conducted away by metal fins 30 in contact with cold water 19 in said cold wheel sump 23. The temperature is reduced and residual gas pressure pushes liquid working fluid 14 through said liquid return tube 29 to an upper hot wheel generator 11, back on said hot wheel 12. This mechanism is the means for completing the criss-cross fluid pattern. The cold wheel sump 23 is a large reservoir that receives heat without any large temperature rise, while flowing past said cold wheel 21, reducing internal enthalpy.

This completes the third portion of the thermodynamic cycle from Points (C) to (D). The competing processes for pressurized liquid transfer and reliquefaction pressure reduction are done together, inside said heat operated motor 10, for all three wheels from points (A) to (B), and during (C) to (D) to replenish said working fluid 14.

The fourth and last of the four portions of the complete thermodynamic cycle for said heat operated motor 10 restores conditions as they were at the start of the first cycle. This fourth part of the cycle is started at point (D) when contact is broken at said cold water 19, as each partially empty cold wheel condenser 22 rotates out of said cold wheel sump 23. At this time its opposite top hot wheel generator 11 has previously broken contact at point (B) when gas evolution was stopped, thus reducing pressure. Liquid mercury 16 refilling also takes place continuously from the bottom to the top accumulators 24 against a minimum backpressure at point (D).

When conditions within said cold wheel condenser 22 are finally reached with $p_2$ $v_2$ $t_2$ then said working fluid 14 is at point (D). There is no recompression pump required in this apparatus to close the path from point (D) to point (A) on FIG. (3). The useful power that may be derived from the apparatus, as a result of the aforementioned thermodynamic cycle, is substantially proportional to the enclosed area depicted in FIG. (3) for the entire path A B C D A.

This final stage of refilling, at reduced pressure, from point (D) to (A) is completed as gravity causes rotation between points (B) to (C). Transfer was done by raising pressurized liquid working fluid 14, transferred back into an upper hot wheel generator 11, by means of said liquid return tube 29. Said replenished hot wheel generator 11 reenters said hot liquid 15 just before it completes rotating by gravity into said hot wheel sump 13 at point (A).

Said heat operated motor 10 is axle mounted and supported on support bearings 31. A power takeoff 32 is located at the cold end of the machine, outboard of said support bearing 31. Said top accumulators 24 constitute a rotating series of containers that are continuously refilled; at the top, with said liquid mercury 16. It is continuously raised against the force of gravity to fill these top containers and produce work. This is also true of the criss-cross pattern of motion for the hot and cold working fluid 14 that is continuously trading places, from the bottom to the top containers, between the other two wheels.

When said accumulators 24 rotate to a lowest level, the upper surface of said liquid mercury 16 inside, is exposed to the high pressure gas transmitted through said gas pressure tube 27. The apparatus uses liquid mercury 16 in said power wheels 17 that has been stabilized for corrosion control by the addition of 10 ppm titanium, as an inhibitor dissolved in the mercury, so that low carbon steels can be used for the tanks and piping.

OPERATION OF THE INVENTION

Said heat operated motor 10, rotates by means of a closed self regenerative heating cycle. Rotation results from the vaporization, and cyclic condensation of said working fluid 14. A large temperature difference, implemented by hardware in this invention, is the means by which the well known Carnot cycle provides high thermal efficiency for said heat operated motor 10. At slow revolutions per minute the thermal efficiency is above 33% depending on the hot wheel 12, and the cold wheel 21 temperatures.

Heat causes said internal working fluid 14 to be vaporized by changing it's state to a gas. Said gas pressure tube 27 communicates with said liquid mercury 16 inside said accumulator 24. From points (A) to (B), said liquid mercury 16 is pushed against gravity from a bottom accumulator 24 through said liquid transfer tube 18 to a top accumulator 24. Simultaneously, hot and cold liquids are pushed against gravity from the bottom vessels, on the hot and cold wheels, in a criss-cross motion to the top vessels on opposite wheels.

Internally the machine operates by simultaneously raising these liquids from the lowest vessels to the highest vessels, as the motor rotates. This is done by raising hot liquid working fluid 14, under pressure, to the cold wheel 21 via said liquid delivery tube 28, from point (A) to point (B). The same amount of replenished working fluid 14 is simultaneously raised back to the hot wheel 12 under reduced back pressure, via said liquid return tube 29 means, from points (C) to (D). This criss-cross motion of equal amounts of hot and cold working fluid 14 coupled with the liquid mercury 16, elevated via liquid transfer tube 18 means, rotating by gravity from points (B) to (C) is the heart of the invention. At point (C), said working fluid has completed its thermodynamic expansion.

After point (C) vapor has moved into a bottom cold wheel condenser 22, where it condenses at some temperature $T_2$ provided by said cold water 19 in said cold wheel sump 23. From points (D) to (A) the residual gas pressure remaining in a top hot wheel generator 11 is overcome by injecting liquid from a bottom cold wheel condenser 22, just before gravity rotates said hot wheel generator 11 to reenter said hot liquid 15 to start the cycle again.

I claim:

1. An apparatus comprised of two liquid containing sumps, a multiplicity of groups of four fluid containment vessels connected to each other by fluid transfer tubes and to an axle by spokes with the axle supported by bearings so that the shaft can rotate, with the vessels located in pairs such that the pairs are located approximately 180° apart axially and such that each member of one pair is located at approximately an equal longitudinal distance along the shaft from a corresponding member of the other pair; each group of vessels with approximately the same longitudinal location on the shaft constituting a wheel located in relation to the sump so the vessels are alternately immersed and lifted out as the axle rotates, the sump under one wheel being relatively hotter than the one under the other wheel, each group of four vessels containing a binary mixture of miscible liquids having vapor pressure intermediate between the vapor pressure of the pure components and a transfer tube arrangement such that the vapor pressure in the heated vessel drives the liquid phase from lower vessels into the upper vessels in a criss-cross pattern, the liquid from the hot wheel going to the cold wheel and the liquid from the cold wheel going to the hot wheel, the resulting unbalance causing rotation of the axle which continues due to the alternate heating and cooling of the fluid as it rotates.

2. An apparatus according to claim 1 to the shaft of which is added a power wheel which modulates the speed of rotation, said power wheel comprising vessels containing mercury and connected by spokes, transfer tubes and check valves arranged so pressure of the vapor of the working fluid drives the mercury from a lower vessel to an upper vessel in phase with the transfer of the working liquid such that the greater density of the mercury tends to slow down the speed of rotation.

* * * * *